United States Patent [19]
Jinbo

[11] Patent Number: 5,847,641
[45] Date of Patent: Dec. 8, 1998

[54] BICYCLE COMPUTER

[75] Inventor: Masahiko Jinbo, Minamikawachi-gun, Japan

[73] Assignee: Shimano, Inc., Osaka, Japan

[21] Appl. No.: 878,986

[22] Filed: Jun. 19, 1997

[30] Foreign Application Priority Data

Jul. 23, 1996 [JP] Japan .................................. 8-211945

[51] Int. Cl.⁶ .................................................... B62J 3/00
[52] U.S. Cl. ......................... 340/432; 340/438; 340/456; 340/459; 340/461; 340/601; 340/870.01; 364/565; 364/561
[58] Field of Search .................................. 340/432, 459, 340/461, 438, 456, 601, 462, 525, 602, 973, 870.01; 364/420, 424.01–424.05, 431.05, 431.12, 565, 561; 342/26

[56] References Cited

U.S. PATENT DOCUMENTS

| | | | |
|---|---|---|---|
| 4,599,723 | 7/1986 | Eck | 371/47 |
| 4,638,448 | 1/1987 | Cuvelier et al. | 364/565 |
| 4,780,864 | 10/1988 | Houlihan | 368/10 |
| 4,865,044 | 9/1989 | Wallace et al. | 128/736 |
| 4,881,187 | 11/1989 | Read | 364/565 |
| 5,072,209 | 12/1991 | Hori et al. | 340/432 |
| 5,357,177 | 10/1994 | Fey et al. | 318/3 |
| 5,435,315 | 7/1995 | McPhee et al. | 128/670 |
| 5,483,137 | 1/1996 | Fey et al. | 318/560 |
| 5,497,143 | 3/1996 | Matsuo et al. | 340/432 |
| 5,600,301 | 2/1997 | Robinson, III | 340/442 |
| 5,602,524 | 2/1997 | Mock et al. | 340/447 |

FOREIGN PATENT DOCUMENTS

| | | | |
|---|---|---|---|
| 0 416 325 A2 | 3/1991 | European Pat. Off. | H04L 1/00 |
| 2533025 | 3/1984 | France | G01C 22/00 |
| 4004981 C1 | 5/1991 | Germany | G07C 5/08 |
| 62-11871 | 3/1987 | Japan | A63B 23/04 |
| 89/00401 | 1/1989 | WIPO | A61B 5/22 |
| 93/16891 | 9/1993 | WIPO | B60C 23/04 |

OTHER PUBLICATIONS

Patent Abstracts of Japan, publication No. 05347649, published Dec. 27, 1993.

European search report for EP 97305274.9, dated Nov. 5, 1997.

*Primary Examiner*—Nina Tong
*Attorney, Agent, or Firm*—James A. Deland

[57] ABSTRACT

A device for transmitting sensor signals in a bicycle includes a sensor for sensing an operational condition of a bicycle component and for outputting a sensor signal having a selected type. A digital transmission circuit operationally associated with the sensor outputs a digital message in response to the sensor signal. The digital message includes 1) a digital sensor value comprising a series of bits representing a value of the sensor signal; and 2) a digital identification value for indicating the selected type of the sensor signal. Such a message allows a sensor having any physical design to be connected to the computer.

14 Claims, 8 Drawing Sheets

| DETECTION ID SIGNAL | TYPE OF SIGNAL | VALUE OF |
|---|---|---|
| 0 | PULSES GENERATED BY ROTATING WHEEL (1 PULSE/REVOLUTION) | 255 |
| 1 | PULSES GENERATED BY ROTATING WHEEL (2 PULSES/REVOLUTION) | 255 |
| 2 | PULSES GENERATED BY ROTATING WHEEL (3 PULSES/REVOLUTION) | 255 |
| 3 | PULSES GENERATED BY ROTATING WHEEL (4 PULSES/REVOLUTION) | 255 |
| 4 | TIME NEEDED FOR 1 WHEEL REVOLUTION (10 msec) | 0 TO 255 |
| 5 | SHIFT POSITION OF FRONT GEAR | 1 TO 255 |
| 6 | SHIFT POSITION OF BACK GEAR | 1 TO 255 |
| 7 | TORQUE OF BOTTOM BRACKET AXLE (1 N · m) | 0 TO 255 |
| 8 | BRAKING FORCE OF FRONT WHEEL (1 N) | 0 TO 255 |
| 9 | BRAKING FORCE OF BACK WHEEL (1 N) | 0 TO 255 |
| ... | ... | ... |
| 15 | | |

BICYCLE COMPUTER

BACKGROUND OF THE INVENTION

The present invention is directed to bicycle computers and, more particularly, to a method and apparatus for transmitting sensor signals between the computer components.

Bicycles are often equipped with display devices for measuring, calculating and displaying various parameters such as bicycle speed, distance traveled, lap time, torque applied to the bottom bracket axle, and shift position of the shifting mechanism, as well as the rider's pulse, blood pressure, and other parameters. These display devices receive signals output by sensors used to measure these parameters. In the past, such display devices were equipped with dedicated sensors and specialized interface circuits that used unique communication protocols to process the sensor data. As a result, only the sensors supplied by the manufacturer of the bicycle computer could be used with the display. This posed a problem if the offered sensor was not compatible with the component to be monitored. Even with the sensors designed for use with the display device, complicated procedures are needed to correctly connect the signal lines from the various types of sensor signals to the prescribed terminals of the interface circuitry, making it more likely that incorrect connections will be made.

Problems related to design, attachment strength, breakage, and the like could be addressed if it were possible for bicycle manufacturers and bicycle component manufacturers to design sensors that are compatible both with the component to be monitored and with the computer. However, present computer designs do not provide such capability because of the inability to interface with the computer in a standard way.

SUMMARY OF THE INVENTION

The present invention is directed to a bicycle computer which employs a standard communication protocol for all types of sensors so that different physical sensor designs may communicate with the computer. In one embodiment of the present invention, a device for transmitting sensor signals in a bicycle includes a sensor for sensing an operational condition of a bicycle component and for outputting a sensor signal having a selected type, and a digital transmission circuit operationally associated with the sensor for outputting a digital message in response to the sensor signal. The digital message includes 1) a digital sensor value comprising a series of bits representing a value of the sensor signal; and 2) a digital identification value for indicating the selected type of the sensor signal. Such a message allows a sensor having any physical design to be connected to the computer.

In a more specific embodiment, the digital transmission circuit includes a start bit at a beginning of the digital message, and the start bit is immediately followed by a signal length bit. The signal length bit informs the processor how much data is included in the message so that the processor can process the message accordingly. The signal length bit can be followed by both the digital sensor value and the digital identification value.

The method according to the present invention comprises the steps of sensing an operational condition of a bicycle component with a sensor; outputting, by the sensor, a sensor signal having a selected type; receiving the sensor signal by a digital transmission circuit; and outputting, by the digital transmission circuit, a digital message. As noted above, the message includes 1) a digital sensor value comprising a series of bits representing a value of the sensor signal; and 2) a digital identification value for indicating the selected type of the sensor signal. In a more specific embodiment of the method, a start bit is included at a beginning of the digital message, and the start bit is immediately followed by a signal length bit. Again, the signal length bit informs the processor how much data is included in the message so that the processor can process the message accordingly. The signal length bit can be followed by both the digital sensor value and the digital identification value.

DETAILED DESCRIPTION OF THE EMBODIMENTS

Figure 1:
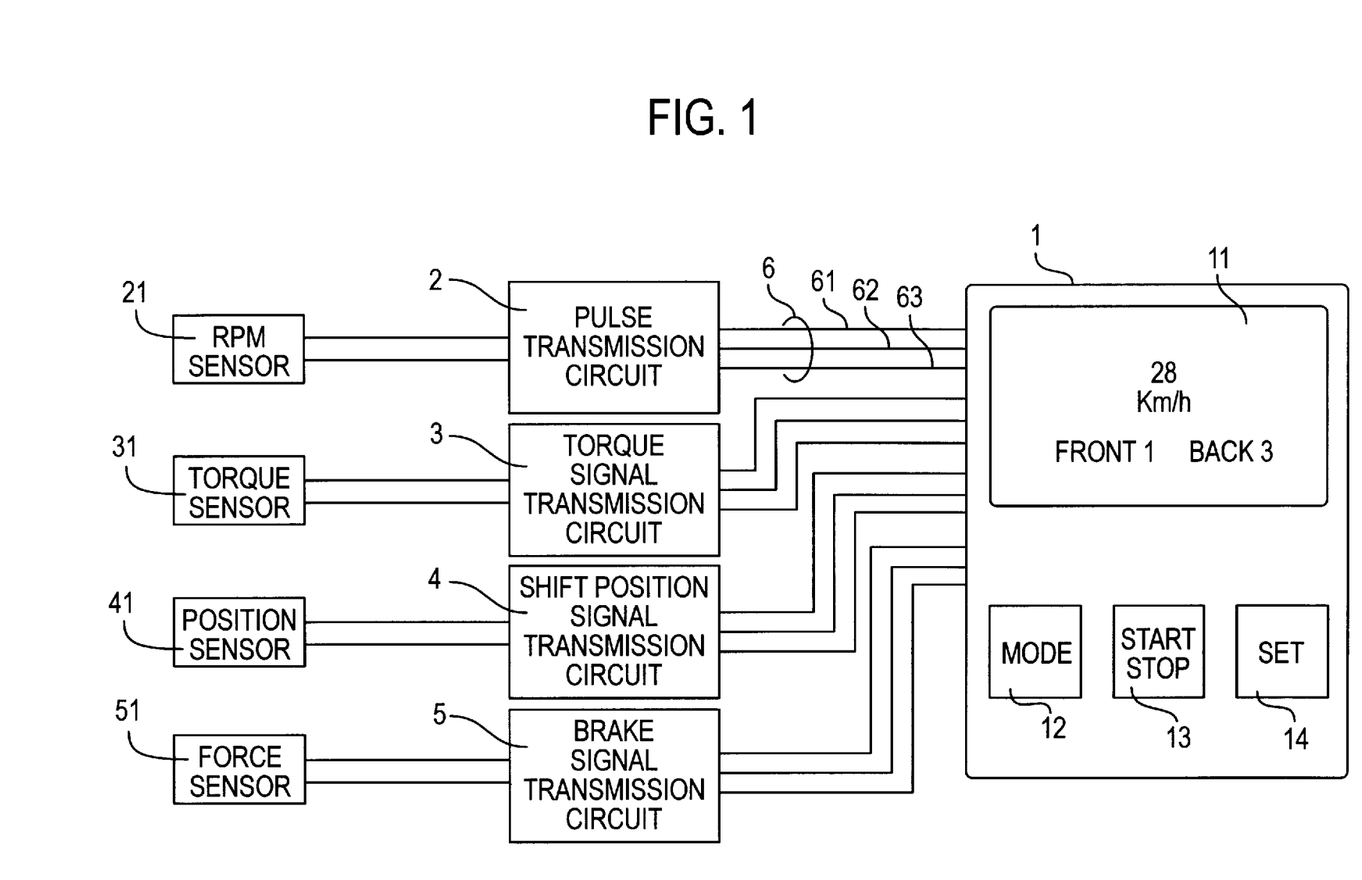
FIG. 1 is a block diagram of a particular embodiment of a bicycle computer according to the present invention.

FIG. 1 is a diagram depicting the manner in which detector devices and a display device are connected in a bicycle in order to implement the method and apparatus for transmitting sensor signals in accordance with the present invention. A display device 1 is designed to measure, calculate and display various parameters such as bicycle speed, distance traveled, lap time, torque applied to the bottom bracket axle, and shift position of the shifting mechanism, as well as the rider's pulse and blood pressure. The device is installed on the bicycle handlebar or in another location readily seen by the rider. The display device 1 is equipped with a liquid-crystal panel or other display 11, and the aforementioned parameters are displayed as digital images, bar graphs, or other suitable images.

The display device 1 is also equipped with various switches for controlling the display device 1. A mode selection switch 12 is used to select the type of parameter displayed by the display 11 or to select the manner in which the parameter is displayed. A start/stop switch 13 is used to control the beginning and the end of a measurement procedure designed to measure the distance traveled or the lap time. A setting switch 14 is used to set the outside wheel diameter and other numerical values necessary display or compute the bicycle speed, the distance traveled, or the like.

Bicycle components are equipped with sensors for detecting various detection values and with signal transmission circuits for transmitting the detected signals to the display device 1. A magnetic sensor 21, which is used to detect the rotational velocity of the front wheel or other wheels, comprises a lead switch or other component for detecting the approach of one or more magnets rotating together with the wheel, and it generates a pulse every time the wheel has turned a prescribed angle. As soon as the magnetic sensor 21 has generated a pulse, a pulse signal transmission circuit 2 sends this pulse signal to the display device 1.

A torque sensor 31 is used to detect the torque acting on the bottom bracket axle, that is, the pedaling force of the rider. Because the output of the torque sensor 31 is an analog value, a torque signal transmission circuit 3 performs A/D conversion (analog/digital conversion) and sends the result as a digital torque signal to the display device 1. A positional sensor 41, which is used to detect the shift position of the shifting mechanism, the shift position by detecting the position of the moving parts of the shift lever, rear derailleur, or the like. The positional sensor 41 can produce an analog or a digital output, and a shift position signal transmission circuit 4 performs A/D conversion as needed and transmits a digital shift position signal to the display device 1. When shifting mechanisms are provided both at the front and in the back, each of the shifting mechanisms is equipped with a positional sensor and a transmission circuit.

A strain gage or other force sensor 51 is used to detect the pressure exerted on the brake block or other frictional member. The sensor commonly produces an analog output, but it may also produce a digital binary output capable of actuating the system once the pressure exceeds a prescribed level. The brake signal transmission circuit 5 performs A/D conversion as needed and transmits digital brake signals to the display device 1. Because the brake signals are displayed in an appropriate form by the display device 1, the rider can monitor the operating state of the brakes and prevent the wheels from being locked by excessive braking force. Both the front wheel brake and the rear wheel brake are equipped with force sensors and transmission circuits.

It is also possible to install sensors for measuring the rider's pulse, blood pressure, and the like and to display these parameters with the aid of the display device 1. The display device 1 and the respective signal transmission circuits are connected to each other with the aid of three-conductor signal power cables 6. Each signal power cable 6 comprises a power wire 61 for supplying a power voltage of +5 V, a signal wire 62 for transmitting signals, and a common ground wire 63 for the power supply and signals. Each signal transmission circuit receives the power voltage from the display device 1 via the power wire 61, and various signals are transmitted from the signal transmission circuits to the display device 1 via the signal wire 62. The display device 1 contains a dry cell, a rechargeable dry cell, or the like as a power supply.

The display device 1 has a plurality (for example, four to ten) of connectors 71 through 74 (FIG. 8) for connecting various sensors and signal transmission circuits. As will be described below, the sensor signals arriving from the signal transmission circuits are furnished with detection ID signals indicating the types of sensor signals, thus making it possible to clearly identify the information displayed by the sensor signals on the display device 1, irrespective of selection of connectors for connecting the signal power cables 6. Each of the signal power cables 6 can therefore be connected to any connector of the display device 1, simplifying the connection procedures and eliminating possible errors.

Figure 2A:
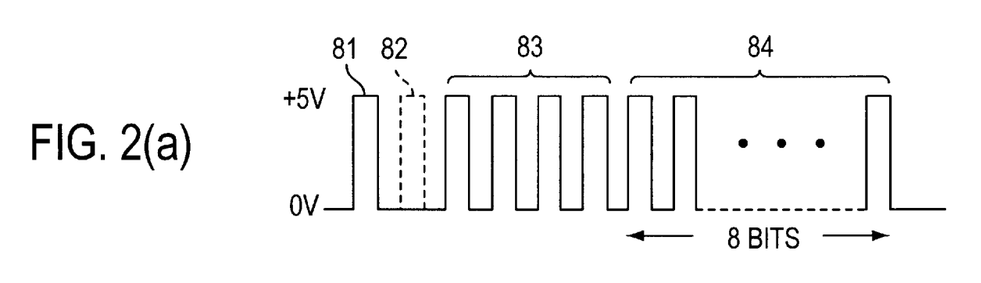
FIGS. 2(a) and 2(b) are particular embodiments of waveform diagrams showing the contents of digital messages generated by the circuits in the bicycle computer shown in FIG. 1.
Figure 2B:
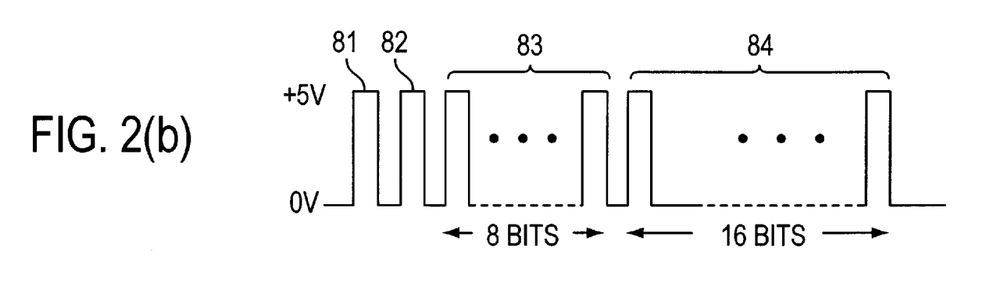

FIGS. 2(a) and 2(b) are waveform diagrams depicting the waveforms of signals transmitted by the signal transmission circuits to the display device 1. The signals are asynchronous baseband signals in which the high level is +5 V and the low level 0 V, and in which the pulse width and pause width of each pulse are set at prescribed levels, such as a pulse width of 10 μsec and a pulse pause width of 10 μsec. The low level is maintained in the absence of signals, and the first signal pulse constitutes a high-level start bit 81. The bit that follows the start bit 81 is a signal-length bit 82 indicating the number of bits in the entire sensor signal.

As shown in FIG. 2(a), when the signal-length bit 82 is at the low level (i.e., zero), a detection ID signal 83 has four bits, and a sensor signal 84 has eight bits. The number of bits in the entire signal is 14 bits, including the start bit 81 and the signal-length bit 82. As shown in FIG. 2(b), the high level (i.e., one) of the signal-length bit 82 corresponds to expanded data, in which the detection ID signal 83 has eight bits, and the sensor signal 84 has 16 bits. The number of bits in the entire signal of expanded data is 26, including the start bit 81 and the signal-length bit 82. The four- or eight-bit detection ID signal 83 that follows the signal length bit 82 indicates the type, form, and other attributes of the sensor signal 84 and serves to accurately identify the sensor signal 84 on the display device 1. The subsequent eight- or 16-bit sensor signal 84 constitutes the basic data regarding the values detected by each sensor.

Figure 3:
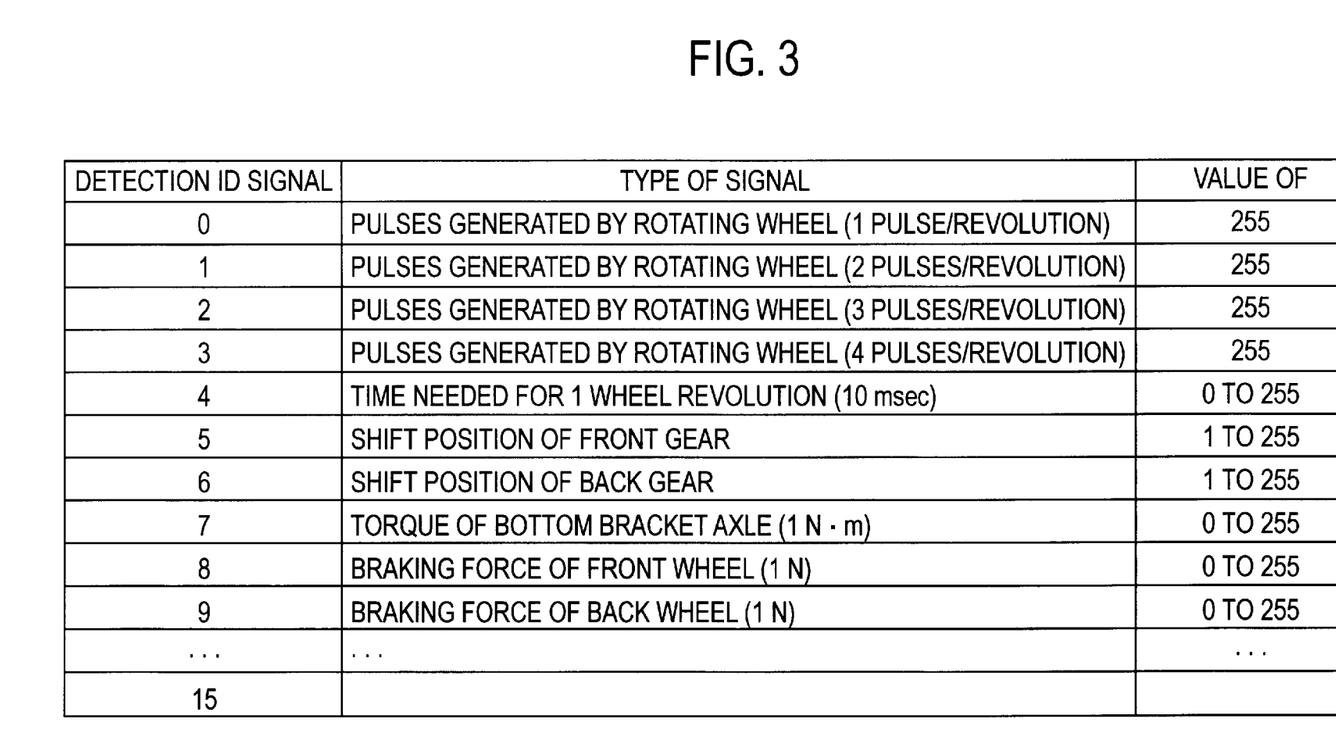
FIG. 3 is a table indicating possible values of the identification signals included in the waveform diagrams shown in FIGS. 2(a) and 2(b)

FIG. 3 is a diagram depicting in the form of a table the values of the detection ID signals and their meaning. The example shown concerns a case in which the signal-length bit is zero. In this case, the detection ID signals can assume values ranging from 0 to 15, and the sensor signals can assume values ranging from 0 to 255. A detection ID signal that is equal to zero indicates that the sensor signals are pulse signals generated by a rotating wheel (one pulse per revolution), resulting in a sensor signal value of 255. Similarly, when the detection ID signal range from one to three, the sensor signals are pulse signals generated by the rotating wheel, but the numbers of pulses per wheel revolution differ from each other.

A detection ID signal that is equal to four corresponds to a case in which the sensor signals indicate the time needed for the wheel to perform one revolution, with the unit of measurement being 10 msec. For example, a sensor signal value of 110 indicates that a single wheel revolution takes 1.1 seconds. Irrespective of whether the sensor signals correspond to the detection ID signals of zero or four, the meaning of the sensor signals can be interpreted, appropriate calculations made in accordance with the type of sensor signals, and the bicycle speed, distance traveled, and other parameters calculated and displayed.

A detection ID signal that is equal to five indicates that the sensor signals denote the shift position of the front chain shifting mechanism, with the sensor signals assuming the values of 1, 2, and so on in order from the lower speeds. When the detection ID signal is equal to six, the result denotes the shift position of the rear chain shifting mechanism, similar to the case in which the signal is equal to five. When the detection ID signal is equal to seven, the sensor signals indicate the torque acting on the bottom bracket axle. The values of the sensor signals can range from 0 to 225, and the unit of measurement may be about 1N·m. When the detection ID signal is equal to eight, the sensor signals indicate the force acting on the front brake. The values of the sensor signals range from 0 to 255, and the unit of measurement is about 1N. When the detection ID signal is equal to nine, the result pertains to the rear brake, similar to the case in which the signal is equal to eight.

Detection ID signal values can also be suitably assigned to the rider's pulse, blood pressure, and other sensor signals.

Appropriately standardizing the types, shapes, units, and other attributes of the sensor signals and furnishing them with detection IDs make it possible for the display device 1 to positively identify the types, shapes, units, and other attributes of the sensor signals and to compute and display the results in an appropriate manner. When the signals have a bit length of one, the detection ID signals can assume values ranging from 0 to 255, and the sensor signals can assume values ranging from 0 to 65,535. Detection IDs obtained using a signal-length bit of one should therefore be used with sensor signals requiring highly accurate detection values.

Figure 4:
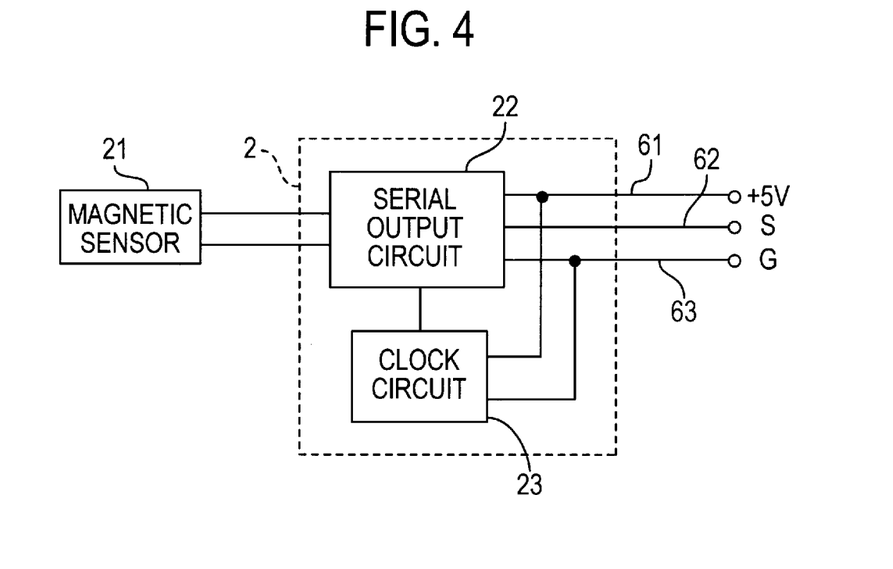
FIG. 4 is a block diagram of particular embodiments of a magnetic sensor and a pulse signal transmission circuit used in the bicycle computer shown in FIG. 1.

FIG. 4 is a block diagram depicting the structure of the magnetic sensor 21 and the pulse signal transmission circuit 2. As described above, the magnetic sensor 21, which is used to detect the rotation of the front wheel or other wheels, comprises lead switches and other components for detecting the approach of one or more magnets rotating together with the wheel, and generates a pulse every time the wheel has turned a prescribed angle. The pulse thus generated is inputted to the serial output circuit 22 of the pulse signal transmission circuit 2. The serial output circuit 22 initiates a processing routine immediately after receiving the pulse, and thereafter outputs a start bit, a signal-length bit, detection ID signals, and sensor signals in the form of sequential serial signals. The time periods corresponding to the pulse width and pulse pause width of the serial signals are set by the clock signals from a clock circuit 23.

Figure 5:
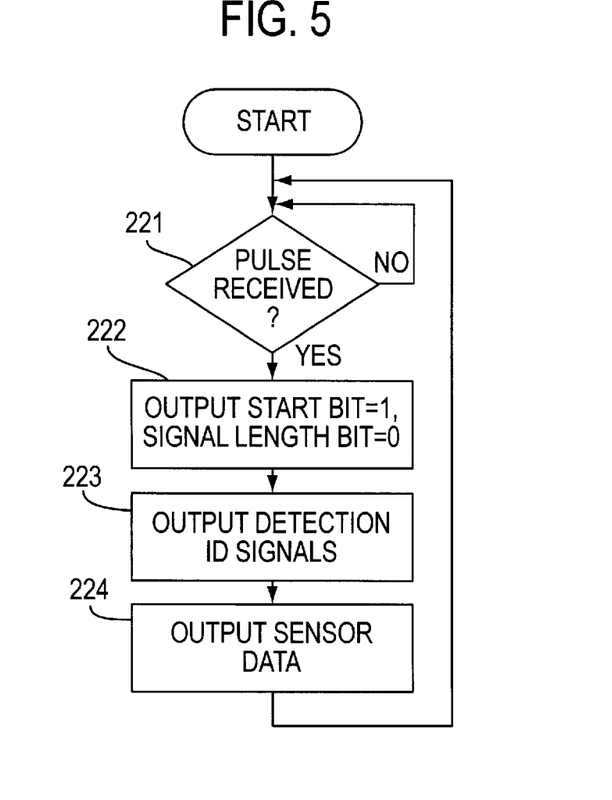
FIG. 5 is a flow chart illustrating a particular embodiment of the operation of the circuit shown in FIG. 4.

FIG. 5 is a flow chart depicting the processing routine performed by the serial output circuit 22. The serial output circuit 22 constantly monitors the input terminals, verifies that a pulse has been received from the magnetic sensor 21 during a verification step 221, continues monitoring if there has been no input, and proceeds to a processing step 222 if a pulse has been inputted. A start bit of one and a signal-length bit of zero are outputted during the processing step 222. Detection ID signals are subsequently outputted as serial signals during a processing step 223. Because these sensor signals correspond to a detection ID of zero, four zero bits are continuously outputted. Sensor signals are subsequently outputted as serial signals during a processing step 224. Because the value of the sensor signals is 225, eight one bits are continuously outputted. Once the processing has ended, the operation returns to the verification step 221, and the processing described above is repeated.

Figure 6:
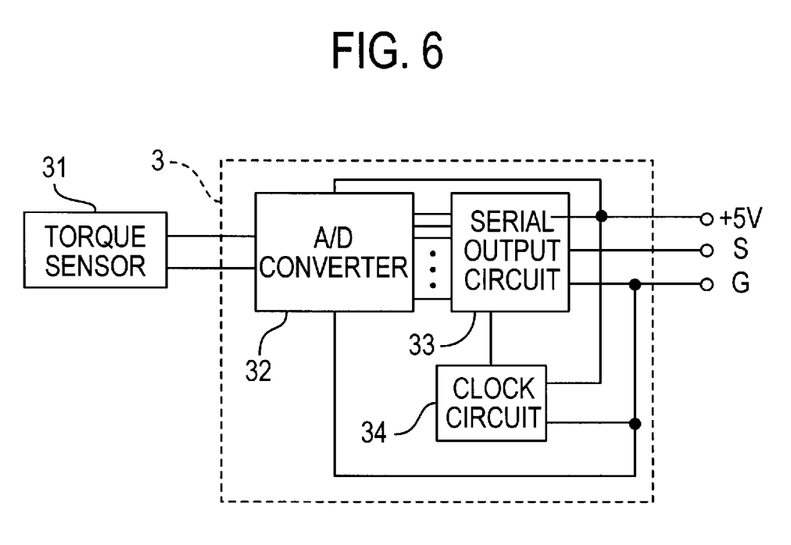
FIG. 6 is a block diagram of a particular embodiment of a torque sensor and a torque signal transmission circuit used in the bicycle computer shown in FIG. 1.

FIG. 6 is a block diagram depicting the structure of a torque sensor 31 and a torque signal transmission circuit 3. As described above, the torque sensor 31 outputs, as an analog value, the torque acting on the bottom bracket axle. The analog output is converted to a digital value by the A/D conversion circuit 32 of the torque signal transmission circuit 3 and inputted to the a serial output circuit 33. The digital torque signals are transmitted as serial signals to the display device 1 by the serial output circuit 33 at prescribed time intervals determined by clock circuit 34. Start bits, signal-length bits, and detection ID signals are furnished in the process.

Figure 7:
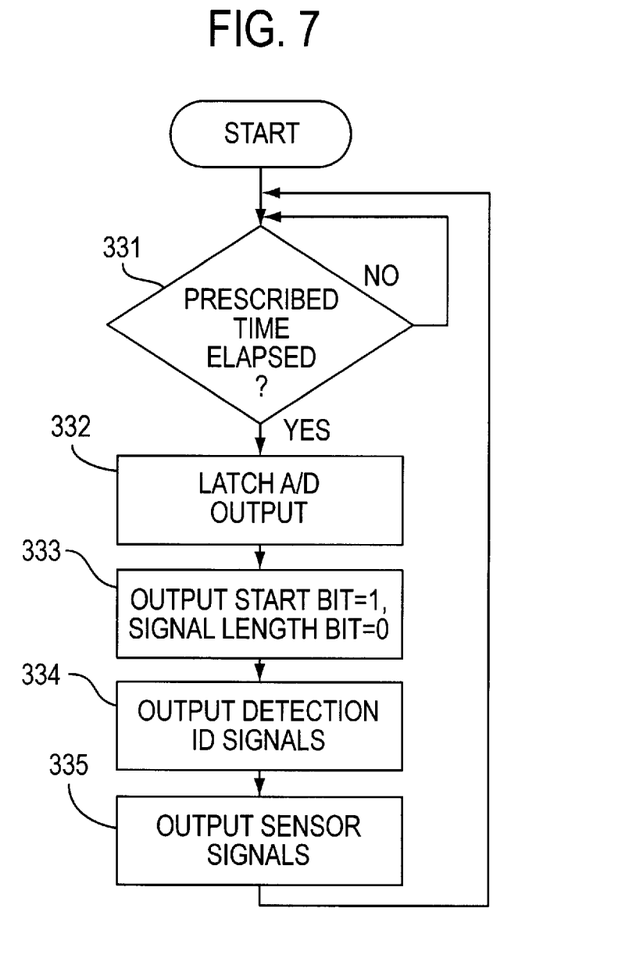
FIG. 7 is a flow chart illustrating a particular embodiment of the operation of the circuit shown in FIG. 6.

FIG. 7 is a flow chart depicting the processing routine of the serial output circuit 33. The serial output circuit 33 counts the clock signals of the a clock circuit 34 and, during a verification step 331, verifies that a prescribed time has elapsed since the previous signal transmission. A standby mode is established if the prescribed time has not elapsed, and the operation proceeds to a processing step 332 if the prescribed time has elapsed. During the processing step 332, a latch command is outputted to the A/D conversion circuit 32, and the A/D conversion output is latched. A start bit of one and a signal-length bit of zero are subsequently outputted during a processing step 333. Detection ID signals are subsequently outputted as serial signals during a processing step 334. Because the sensor signals correspond to a detection ID of seven, four bits (0, 1, 1, 1) are continuously outputted. The sensor signals are subsequently outputted as serial signals during a processing step 335. If the value of the torque sensor signals is 99, eight bits (0, 1, 1, 0, 0, 0, 1, 1) are continuously outputted. Once the processing has ended, the operation returns to the verification step 331, and the processing described above is repeated.

Figure 8:
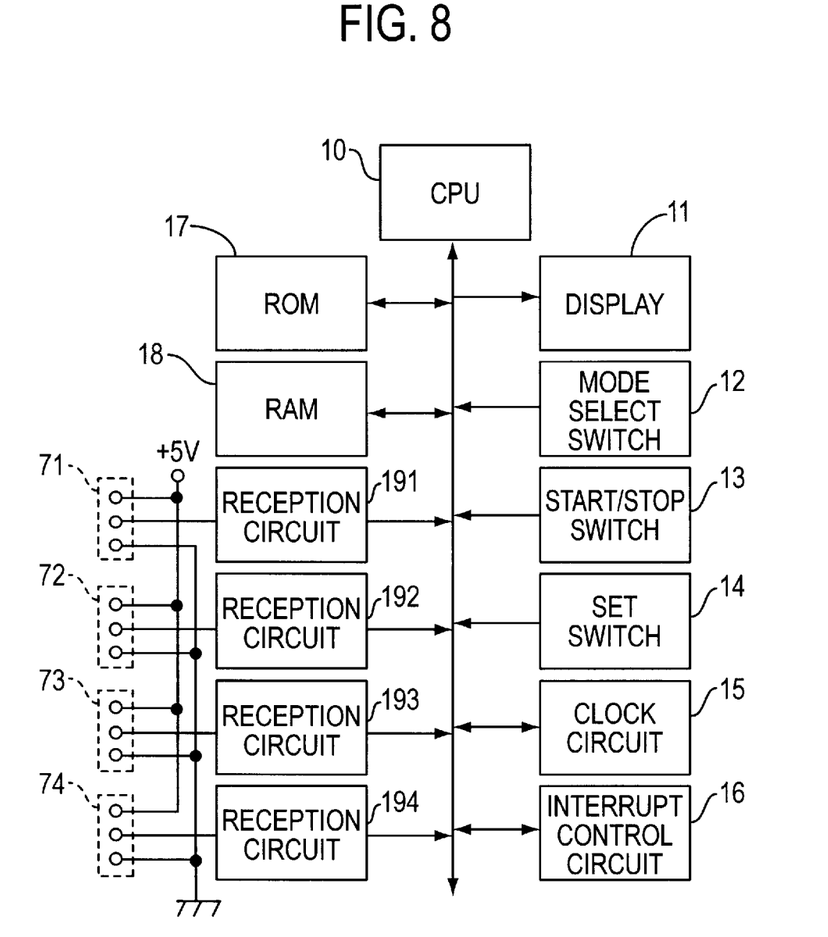
FIG. 8 is a block diagram showing the structure of a particular embodiment of the display unit shown in FIG. 1.

FIG. 8 is a block diagram depicting the structure of the internal circuit of the display device 1. The display device 1 is controlled by an CPU 10. Based on detection ID signals, the CPU 10 identifies the sensor signals received by reception circuits 191 through 194, performs the necessary calculations, and displays the results on a display 11. The CPU 10 performs the necessary processing in accordance with the data and programs stored in ROM 17 and RAM 18. For attributes that require accurate processing of generation timing, such as the pulse signals generated by wheel rotation, an interrupt command is sent from the reception circuits 191 through 194 to the CPU 10 via an interrupt control circuit 16, and processing is immediately started by the interrupt control of the CPU 10.

Figure 9:
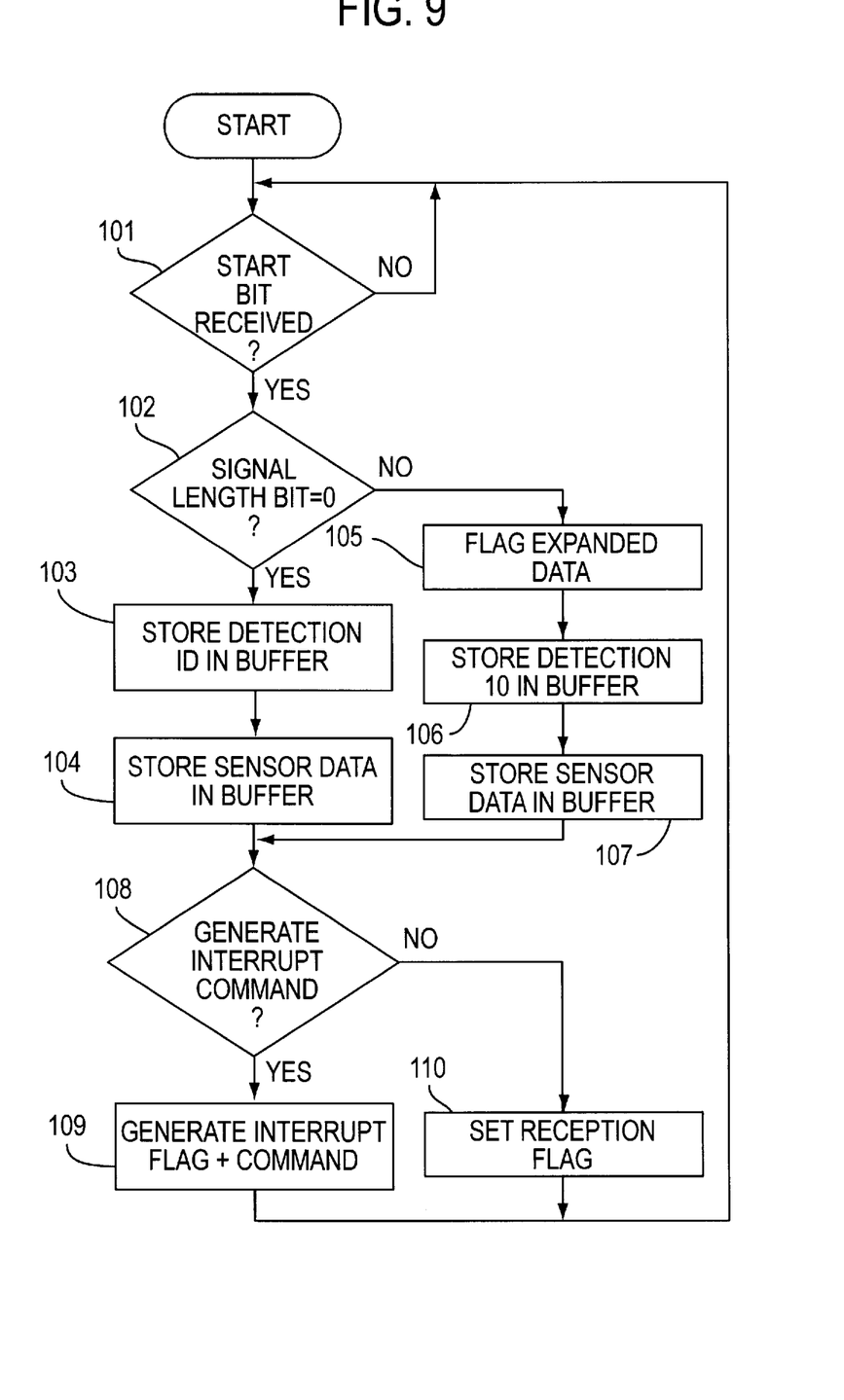
FIG. 9 is a flow chart showing a particular embodiment of a processing routine used in the circuitry shown in FIG. 8.

FIG. 9 is a flow chart depicting a processing routine for the reception circuits 191 through 194 of the display device 1. The reception circuit 191 monitors the voltage level of the signal wire 62 and the receipt of a start bit. Because the voltage level is low in the absence of a signal, clear differentiation can be achieved if a high-level start bit has been received. The receipt of a start bit is verified during a verification step 101, the operation proceeds to the subsequent verification step 102 if a start bit has been received, and the receipt of start bits is monitored further if no signal has been received.

During the verification step 102, the next signal-length bit is read to ascertain whether the value thereof is zero. If the signal-length bit is zero, the operation proceeds to a processing step 103, the four bits of the detection ID signals that follow the signal-length bit are read, zeros are assigned to the four upper bits, and the result is stored as one-byte data in the FIFO buffer (first-in, first-out buffer) inside the reception circuit 191. During the subsequent processing step 104, the eight bits of the sensor signals that follow the detection ID signals are read and stored as one-byte data in the FIFO buffer. The operation then proceeds to a verification step 108.

If the signal-length bit is one during the verification step 102, the operation proceeds to a processing step 105, and one-byte data 255 are stored in the FIFO buffer as a flag indicating that the sensor signals constitute expanded data. The operation proceeds to the subsequent processing step 106, and the eight bits of the detection ID signals that follow the signal-length bit are read and stored as one-byte data in the FIFO buffer. During the subsequent processing step 107, the 16 bits of the sensor signals that follow the detection ID signals are read and stored as two-byte data in the FIFO buffer. The operation then proceeds to a verification step 108.

During the verification step 108, it is determined based on the values of the detection ID signals whether an interrupt command is to be generated for the CPU 10. If an interrupt command is to be generated, an interrupt flag is set up in the flag register inside the reception circuit 191 during a processing step 109, and an interrupt command is sent to the CPU 10 via the interrupt control circuit 16. A reception flag is set up in the flag register during a processing step 110 if no interrupt signals are to be generated by the detection ID signals during the verification step 108. Following the processing steps 109 and 110, the operation returns to the verification step 101, and the processing described above is repeated.

While the above is a description of various embodiments of the present invention, further modifications may be employed without departing from the spirit and scope of the present invention. For example, although the above embodiment was described with reference to a case in which detection ID signals and sensor signals were transmitted in sequence as serial signals following the start bit and the signal-length bit, it is also possible to reverse the sequence of the detection ID signals and sensor signals. Furthermore, the presence of a signal-length bit is not always necessary, and it is possible to fix the signal data length and to transmit only a start bit, detection ID signals, and detector devices. It is also possible to furnish such a group of transmitted signals with parity bits or other error-detecting codes, or with error-correcting codes or the like. Thus, the scope of the invention should not be limited by the specific structures disclosed. Instead, the true scope of the invention should be determined by the following claims.

What is claimed is:

1. An apparatus for transmitting sensor signals in a bicycle comprising:
    a first sensor for sensing a first operational condition of a bicycle component and for outputting a first sensor signal having a first sensor type selected from the group comprising an RPM sensor type a torque sensor type, a shift position sensor type and a braking force sensor type;
    a second sensor for sensing a second operational condition of a bicycle component and for outputting a second sensor signal having a second sensor type selected from the group comprising an RPM sensor type, a torque sensor type, a shift position sensor type and a braking force sensor type;
    wherein the first sensor type is different from the second sensor type;
    a digital transmission circuit operationally associated with the first sensor and the second sensor for outputting a first digital message in response to the first sensor signal and a second digital message in response to the second sensor signal, wherein the first digital message includes:
        a first digital sensor value comprising a series of bits representing a value of the first sensor signal; and
        a first digital identification value for indicating the first sensor type; and
    wherein the second digital message includes:
        a second digital sensor value comprising a series of bits representing a value of the second sensor signal; and
        a second digital identification value for indicating the second sensor type.

2. The apparatus according to claim 1 wherein the digital transmission circuit includes a first start bit at a beginning of the first digital message, and wherein the digital transmission circuit includes a second start bit at a beginning of the second digital message.

3. The apparatus according to claim 2 wherein the digital transmission circuit includes only a single first start bit at the beginning of the first digital message, and wherein the digital transmission circuit includes only a single second start bit at the beginning of the second digital message.

4. The apparatus according to claim 2 wherein the digital transmission circuit includes a first signal length bit in the first digital message, wherein the first signal length bit indicates a number of bits in the first digital identification value and a number of bits in the first digital sensor value, and wherein the digital transmission circuit includes a second signal length bit in the second digital message, wherein the second signal length bit indicates a number of bits in the second digital identification value and a number of bits in the second digital sensor value.

5. The apparatus according to claim 4 wherein the digital transmission circuit includes only a single first signal length bit in the first digital message, and wherein the digital transmission circuit includes only a single second signal length bit in the second digital message.

6. The apparatus according to claim 4 wherein the digital transmission circuit includes only a single first start bit at a beginning of the first digital message, immediately followed by only a single first signal length bit, followed by both the first digital sensor value and the first digital identification value, and wherein the digital transmission circuit includes only a single second start bit at a beginning of the second digital message, immediately followed by only a single second signal length bit, followed by both the second digital sensor value and the second digital identification value.

7. The apparatus according to claim 1 wherein the digital transmission circuit includes:
    a first digital transmission circuit operatively associated with the first sensor for outputting the first digital message, wherein the first digital transmission circuit includes a first digital transmission signal cable for communicating the first digital message; and
    a second digital transmission circuit operatively associated with the second sensor for outputting the second digital message, wherein the second digital transmission circuit includes a second digital transmission signal cable for communicating the second digital message;
    and further comprising a message processing circuit including a plurality of message reception circuits having a corresponding plurality of message reception connectors, wherein each of the first digital transmission signal cable and the second digital transmission signal cable can be connected to any one of the plurality of message reception connectors, and wherein the message processing circuit includes means for processing the first digital message and the second digital message regardless of which of the plurality of message reception connectors the first digital transmission signal cable and the second digital transmission signal cable are connected to.

8. A method for transmitting sensor signals in a bicycle comprising the steps of:
    sensing a first operational condition of a bicycle component with a first sensor;
    outputting, by the first sensor, a first sensor signal having a first sensor type selected from the group comprising an RPM sensor type, a torque sensor type, a shift position sensor type and a braking force sensor type;
    sensing a second operational condition of a bicycle component with a second sensor;
    outputting, by the second sensor, a second sensor signal having a second sensor type selected from the group comprising an RPM sensor type, a torque sensor type, a shift position sensor type and a braking force sensor type;

wherein the first sensor type is different from the second sensor type;

receiving the first sensor signal and the second sensor signal by a digital transmission circuit;

outputting, by the digital transmission circuit, a first digital message including:
- a first digital sensor value comprising a series of bits representing a value of the first sensor signal; and
- a first digital identification value for indicating the first sensor type; and outputting, by the digital transmission circuit, a second digital message including:
- a second digital sensor value comprising a series of bits representing a value of the second sensor signal; and
- a second digital identification value for indicating the second sensor type.

9. The method according to claim 8 wherein the step of outputting the first digital message ftuther comprises the step of including a first start bit at a beginning of the first digital message, and wherein the step of outputting the second digital message further comprises the step of including a second start bit at a beginning of the second digital message.

10. The method according to claim 9 wherein the step of including the first start bit comprises the step of including only a single first start bit at the beginning of the first digital message, and wherein the step of including the second start bit comprises the step of including only a single second start bit at the beginning of the second digital message.

11. The method according to claim 9 wherein the step of outputting the first digital message further comprises the step of including a first signal length bit in the first digital message, wherein the first signal length bit indicates a number of bits in the first digital identification value and a number of bits in the first digital sensor value, and wherein the step of outputting the second digital message further comprises the step of including a second signal length bit in the second digital message, wherein the second signal length bit indicates a number of bits in the second digital identification value and a number of bits in the second digital sensor value.

12. The method according to claim 11 wherein the step of including the first signal length bit comprises the step of including only a single first signal length bit in the first digital message, and wherein the step of including the second signal length bit comprises the step of including only a single second signal length bit in the second digital message.

13. The method according to claim 11 wherein the step of outputting the first digital message further comprises the step of including only a single first start bit at a beginning of the first digital message, immediately followed by only a single first signal length bit, followed by both the first digital sensor value and the first digital identification value, and wherein the step of outputting the second digital message further comprises the step of including only a single second start bit at a beginning of the second digital message, immediately followed by only a single second signal length bit, followed by both the second digital sensor value and the second digital identification value.

14. The method according to claim 8 wherein the step of receiving the first digital message and the second digital message comprises the steps of:

receiving the first digital message over any one of a plurality of message reception connectors; and receiving the second digital message over any one of the plurality of message reception connectors;

and further comprising the step of processing, by a message processing circuit, the first digital message and the second digital message regardless of which of the plurality of message reception connectors receives the first digital message and the second digital message.

* * * * *